United States Patent [19]

Elliott

[11] Patent Number: 4,832,917

[45] Date of Patent: May 23, 1989

[54] GROMMETTED SYSTEM FOR LIQUID SCINTILLATION VIALS

[75] Inventor: John C. Elliott, Capistrano, Calif.

[73] Assignee: California State University Fullerton Foundation, Fullerton, Calif.

[21] Appl. No.: 601,941

[22] Filed: Apr. 19, 1984

[51] Int. Cl.[4] ............................................... B01L 3/00
[52] U.S. Cl. .................................. 422/102; 215/1 R; 220/85 K; 356/244; 250/358.1
[58] Field of Search ...................... 220/69, 85 K, 356; 215/100 R, 1 R; 250/328; 356/246, 244; 422/63, 65, 67, 71, 102, 104, 99

[56] References Cited

U.S. PATENT DOCUMENTS

| | | | |
|---|---|---|---|
| 754,168 | 3/1904 | Sherman | 215/1 R |
| 845,777 | 5/1907 | Grossman | 220/85 K |
| 965,188 | 7/1910 | Humphrey | 215/1 R |
| 2,187,559 | 1/1940 | Levy et al. | 215/1 R |
| 2,801,039 | 7/1957 | Arneson | 220/69 |
| 3,004,684 | 10/1961 | Lightburn | 220/356 |
| 3,296,777 | 1/1967 | Jackson et al. | 215/1 R |
| 3,596,099 | 7/1971 | Thomas | 250/328 |
| 3,749,646 | 7/1923 | Pirt | 422/102 |
| 4,137,049 | 1/1979 | Couch et al. | 422/58 |

FOREIGN PATENT DOCUMENTS 2435751 5/1980 France ............................. 250/328

OTHER PUBLICATIONS

Ace Scientific, pp. 48-50; 1983.
Fisher Scientific Catalog, (1982), p. 1064.

Primary Examiner—Michael S. Marcus
Attorney, Agent, or Firm—Tilton, Fallon, Lungmus and Chestnut

[57] ABSTRACT

A 10 to 18 mm. diameter vial, 50 to 65 mm. in height, of specialized construction requires a grommet or integral flange on both ends to retain the vial in vertical position while counting liquid radioactive material therein on a conveyor system.

5 Claims, 1 Drawing Sheet

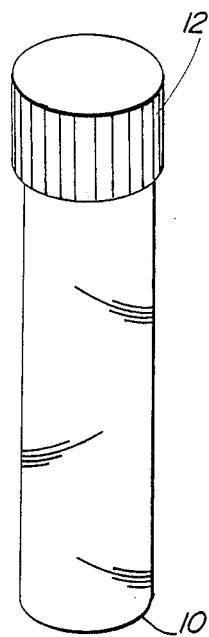
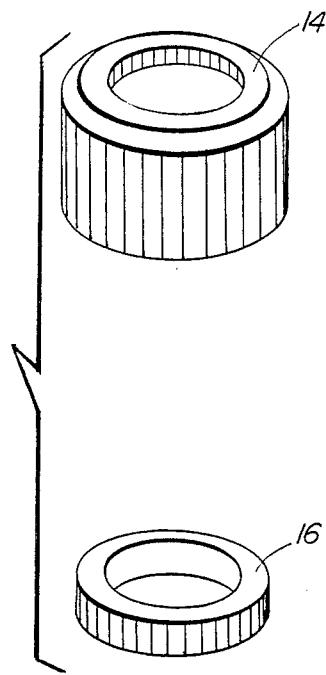
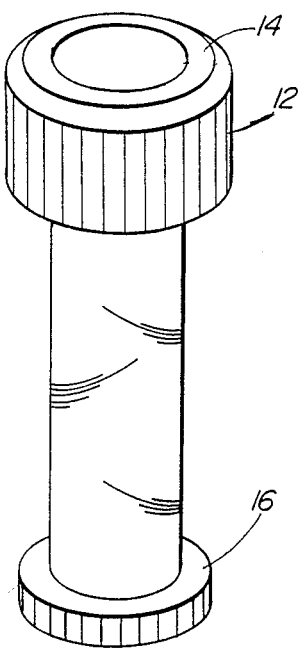

GROMMETTED SYSTEM FOR LIQUID SCINTILLATION VIALS

BACKGROUND OF THE INVENTION

Any mini-vial containing radioactive substances in liquid form therein requires special structural supports when used on conveyors in liquid scintillation counters, and as such detracts from the performance of the mini-vial by increasing the unwanted background and decreasing the optical clarity and therefore the counting efficiency.

Liquid scintillation counting of radioactive materials is accomplished via interaction of a radioactive sample with a cocktail system consisting of fluorescent compounds suspended in solvents within a liquid scintillation vial. This interaction produces visible light photons (proportional to the radiation intensity) which are counted by the LSC apparatus.

Liquid scintillation vials are usually composed of glass or polyethylene, but are also available in quartz, nylon, and teflon models. Most scintillation counters are automated sample changer systems, with changers standardized to accept vials which contain a maximum of approximately 20 ml. of sample and cocktail and have dimensions of 25-30 mm. diameter by 55-65 mm. height.

Since the fluors, vials, and solvents are relatively expensive and usually disposed of after a single use, miniature vials (mini-vials) have been developed. The vials hold approximately 2-7 ml. of cocktail and are approximately 10-18 mm. in diameter and 50-65 mm. in height. These vials are available in the same materials as the aforementioned, and also are available in the form of plastic bags which are heat-sealed after addition of the sample and cocktail.

Since the liquid scintillation process relies on the transmission of light through a vial, the composition and structure of the vials effect the performance of the system. The optical clarity of the vial effects the relative counting efficiency, so clear glass vials usually have better counting efficiency than polyethylene vials. Naturally occurring radioisotopes such as Potassium 40 contribute unwanted radioactive counts (background) to the vials, however, and are most abundant in glass vials. Polyethylene vials have lower backgrounds than glass vials, but are more opaque and have lower efficiencies.

Mini-vials cannot be used in most liquid scintillation counters without adapters which are of the same physical dimensions as the large vials the counters are designed to use. This mini-vial/adapter system, by virtue of the adapter material (glass, plastic, etc.) results in a decrease in the optical clarity of the counting system (decreased efficiency) and a concomitant increase in background. (Heat-sealed bag systems always requires these adapters, and mini-vials require adapters unless being used in counters designed for mini-vials only.) These adapters also add increased work to the sample preparation/counting/clean-up process. Because large vials and mini-vials have different physical dimensions, diameter related effects introduce errors such that results obtained with the two types of vials cannot accurately be directly intercompared.

A final disadvantage to present-day vials is that static electricity affects the counting vials. Peizo Electric Generators, radioactive external alpha sources, and staticidal sprays are employed to eliminate static charges on vials. When mini-vials are used, the requisite adapters diminish the usefulness of these static eliminators.

It was to overcome these inherent defects that the present invention was conceived for liquid scintillation.

BRIEF DESCRIPTION OF THE DRAWINGS

FIG. 1 is a perspective view of a mini-vial;

FIG. 2 is a perspective view of one configuration of the material which must be added as grommets or integral flanges to the cap and bottom of the vial; and FIG. 3 is a perspective view of one configuration of the grommets placed on the vial and cap, or, alternatively, of a specially designed vial in which the grommets are permanently affixed, integral features of the cap and vial.

DETAILED DESCRIPTION OF THE DRAWINGS

As shown in FIG. 1, a mini-vial is provided with a flat bottom 10 and a snap or screw cap 12 to prevent spillage of the liquid sample material in the vial.

The present invention relates to the grommet materials 14, 16 which may be constructed of polyethylene or other vial materials and affixed grommet 14 to the bottom of the vial 10 by slipping the grommet 14 thereon and affixing the grommet 16 to the top of the cap 12, or by permanently securing to each by manufacturing the vials such that they incorporate grommet 14 as an integral feature, and the caps incorporate grommet 16 as an integral feature.

The cap grommet 14 is preferably approximatley 25 mm. to 28 mm. in outside diameter and 1-15 mm. thick, while the lower grommet 16 is preferably approximately 25-28 mm. on the outside diameter and 1-15 mm. in thickness, depending on the model liquid scintillation counter being used. The variation in thickness of the grommets or flanges allows the vials apparent height to be maintained in the optimal 55-64 mm. range preferred by liquid scintillation counting manufacturers.

The internal diameter of both grommets is sized between the 5-18 mm. range depending on the outside diameter of the mini-vial. Grommet/flange 14 is approximately 2.5-15 mm. tall by 25-28 mm. outside diameter and grommet 16 is approximately 1-5 mm. thick by 25-28 mm. diameter when used in a mini-vial system for upward loading elevator liquid scintillation counters.

When employing a downward loading elevator, the upper grommet/flange 14 has preferably approximately approximately a 25-28 mm. outside diameter and is 1-5 mm. thick. The lower grommet 16 has preferably approximately a 28 mm. outside diameter and a thickness of 5-15 mm. The inside diameter varies with the outside diameter of the mini-vial as stated hereinabove.

As stated in the Abstract of the Disclosure, the mini-vial has an approximate dimension of 5-18 mm. in outside diameter and 50 to 65 mm. in height. The adapters, whether slip on or an integral part of specially prepared vials and caps, give the extremities of the mini-vial an apparent diameter of 25-30 mm., and an apparent height of 50-65 mm. This allows the mini-vials to be used in a conveyor system without additional adapters, while allowing the walls and volume of the mini-vial to be smalland thin enough to just support the structure of the vial. The adapters/flanges may be constructed of any of the materials currently employed for liquid scintillation vials.

The cost of the cocktail admixture described above is expensive and therefore it is preferably in many cases to use mini-vials, because the vial and the cocktail are discarded after a single use. Normally sized standard vials contain 18-20 ml. cocktail while mini-vials contain 2-7 ml. of cocktail. Mini-vials must be supported during movement of the conveyor on liquid scintillation counters, and hence require adapters. Existing adapters consist of small open topped bottles of plastic or glass in which the mini-vial is placed, allowing the mini-vial or adapter system to appear to a conveyor system as if it were a large vial. The grommets or integral flanged vials described above will allow the mini-vials to be maintained in a vertical position in conveyors, without the disadvantages of other, external adapters systems. The grommets and/or integrally flanged vials described above may be constructed of polyethylene, nylon, teflon, and potassium or flint glass, or any other materials usable in liquid scintillation counting process.

Although but one specific embodiment of this invention is herein shown and described, it will be understood that details of the construction shown may be altered or omitted without departing from the spirit of the invention as defined by the following claims.

I claim:

1. An optical clarity mini-vial containing a radioactive substance in liquid form for liquid scintillation counting requiring optical clarity, the vial comprising an adapter system having a flat bottom and capped, grommets placed on the cap and bottom portion of the vial for stability on conveyors.

2. The vial according to claim 1 wherein the grommets are affixed to the cap and bottom of the vial.

3. The vial according to claim 1 wherein the grommets are permanently secured to the cap and bottom of the vial.

4. The vial according to claim 1 wherein the mini-vials have an approximately outside diameter of 5 to 18 mm. and the height is approximately 50 to 65 mm. and the cap grommet is approximately 28 mm. outside diameter, the grommet on the bottom of the mini-vial is approximately 25 to 30 mm. outside diameter, and both grommets have a thickness of from 1 to 15 mm.

5. The vial according to claim 4 wherein both grommets have a range of 5 to 18 mm. inside diameter.

* * * * *